United States Patent [19]
Kobza

[11] 3,914,894
[45] Oct. 28, 1975

[54] AUTOMATIC FISH HOOK SETTER
[76] Inventor: Julius J. Kobza, P.O. Box 584, Sonoma, Calif. 95476
[22] Filed: May 10, 1974
[21] Appl. No.: 469,040

[52] U.S. Cl. .................................. 43/15; 43/15
[51] Int. Cl.² .................................. A01K 97/00
[58] Field of Search ................................ 43/15

[56] References Cited
UNITED STATES PATENTS

| | | | |
|---|---|---|---|
| 2,804,277 | 8/1957 | Kinder | 43/15 UX |
| 2,986,834 | 6/1961 | Irwin | 43/15 |
| 3,562,947 | 2/1971 | Martin | 43/15 |
| 3,619,931 | 11/1971 | Brummett | 43/15 |
| 3,722,127 | 3/1973 | Atkins, Sr. | 43/15 |

Primary Examiner—Hugh R. Chamblee
Assistant Examiner—Daniel J. Leach
Attorney, Agent, or Firm—Blair & Brown

[57] ABSTRACT

An automatic fish hook setter which includes a tubular support for the butt of a fishing pole. The tubular butt support is pivotally mounted and has a spring arranged to counteract the normal pull of the fishline but allow the pole to drop when fish pulls on the bait. A second pivotal mounting for the tubular support is maintained rigidly by a toggle brace and a spring is provided for moving the tubular support sharply downwardly when the toggle brace is moved out of alignment. An operating arm on the tubular support engages the toggle brace to move the toggle brace out of alignment when the bait is pulled on by a fish.

5 Claims, 8 Drawing Figures

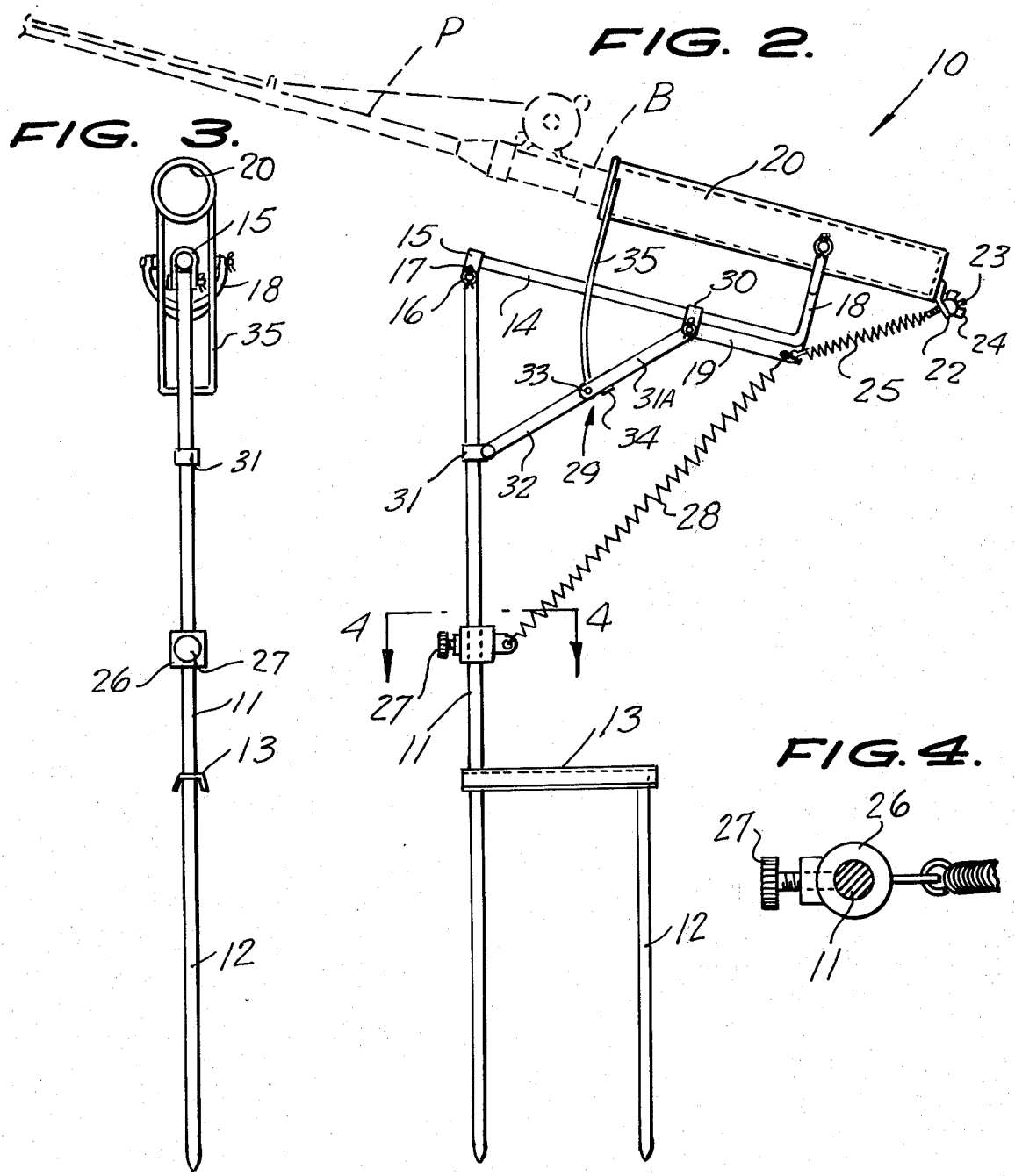

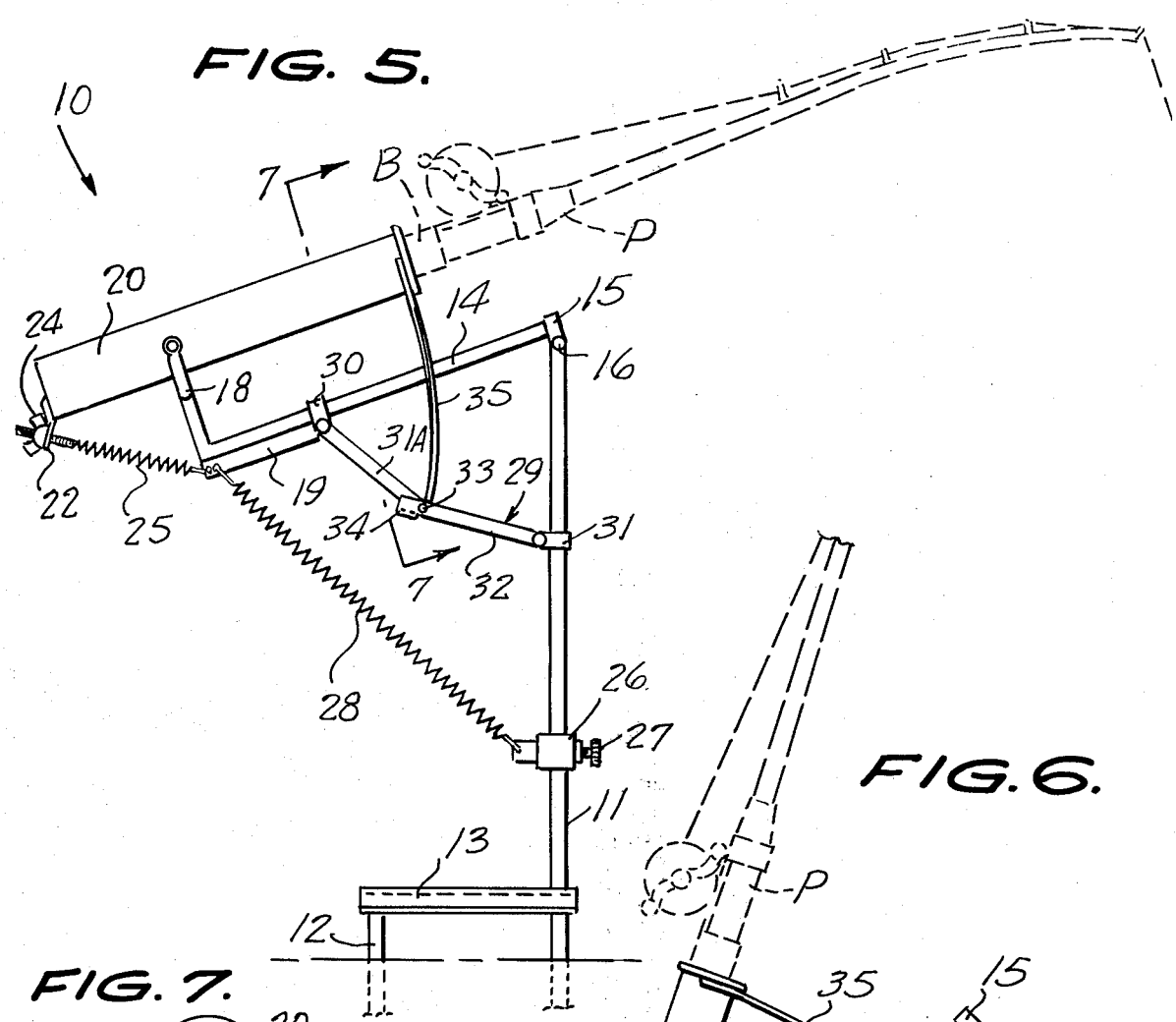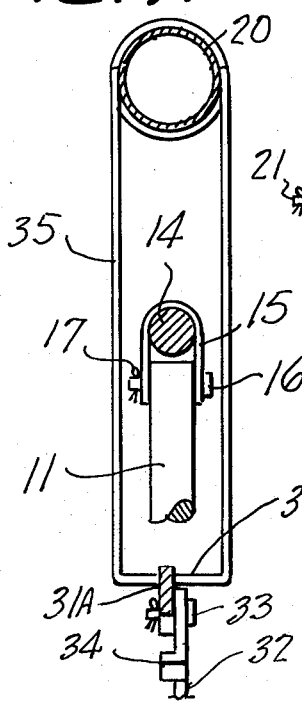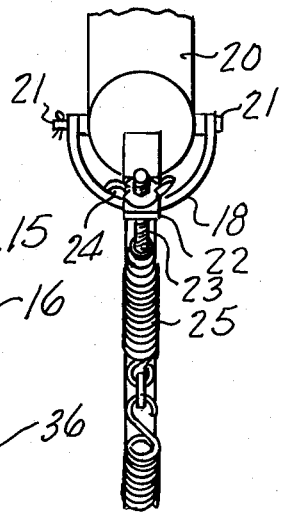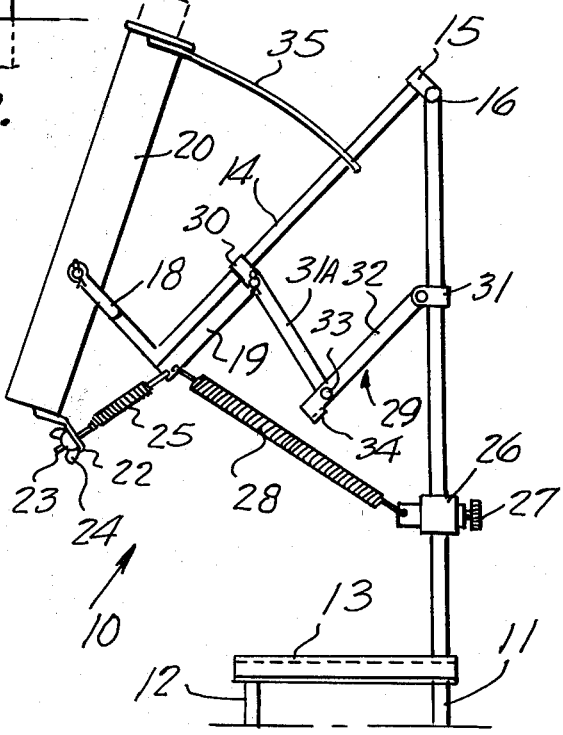

AUTOMATIC FISH HOOK SETTER

BACKGROUND OF THE INVENTION

Field of the Invention

The present invention relates to fish pole holders of the type including an automatic fish hook setter.

Summary of the Invention

The present invention includes a fish pole holder mounted on a ground supported pivot member maintained in generally horizontal arrangement by a toggle brace which can be moved out of alignment to permit the fish pole holder to swing sharply downwardly under the influence of a spring. A tubular support for the butt of the fish pole is mounted for pivotal action on the support and has an arm for forcing the toggle brace out of alignment so as to permit the spring to whip the fish pole from a generally horizontal position to a general vertical position to set the hook. The action of the fish pulling on the bait or hook causes the arm to move the toggle brace out of alignment.

The primary object of the invention is to provide a fish pole holder and automatic fish hook setter which is controlled by the action of the fish and which moves with a snap action to set the hook.

Other objects and advantages will become apparent in the following specification when considered in light of the attached drawings.

BRIEF DESCRIPTION OF THE DRAWINGS

FIG. 1 is a top plan view of the invention;

FIG. 2 is a side elevation of the invention in fishing position;

FIG. 3 is a front elevation of the invention;

FIG. 4 is an enlarged fragmentary vertical sectional view, taken along the line 4—4 of FIG. 2, looking in the direction of the arrows;

FIG. 5 is a side elevation of the invention showing the position of parts immediately after a fish has struck the bait and caused the toggle brace to move out of alignment;

FIG. 6 is a side elevation similar to FIG. 5 with the parts swung into their hook setting position;

FIG. 7 is an enlarged fragmentary vertical sectional view, taken along the line 7—7 of FIG. 5, looking in the direction of the arrows; and FIG. 8 is a fragmentary rear elevation of the invention.

DESCRIPTION OF THE PREFERRED EMBODIMENT

Referring now to the drawings in detail, wherein like reference characters indicate like parts throughout the several figures, the reference numeral 10 indicates generally an automatic fish hook setter and fish pole holder constructed in accordance with the invention.

The holder 10 includes an elongate shaft 11 and a second somewhat shorter shaft 12 arranged in spaced parallel relation thereto. A foot tread 13 extends between and connects the shafts 11, 12 in generally perpendicular relation thereto. The shafts 11 and 12 are adapted to be forced into the ground by foot pressure on the foot tread 13 to arrange the shaft 11 in upright relation extending well above the surface of the ground. A generally horizontal rod 14 has a U-shaped yoke 15 rigidly secured to one end thereof and the yoke 15 is pivotally secured to the upper end of the shaft 11 by means of a pivot pin 16 secured therein by a pin 17. The rod 14 has an upstanding yoke 18 formed on the end thereof opposite the yoke 15 for reasons to be described. A web 19 is rigidly secured to the underside of the bar 14 adjacent the yoke 18. A tubular fishing pole butt support 20 is pivotally mounted in the yoke 18 by pivot pins 21. A bracket 22 on the closed end of the support 20 receives a screw threaded spring hook 23 which is adjustably mounted on the bracket 22 by a wing nut 24. A tension coil spring 25 for the purpose of adjusting the barrel to the weight or length of the pole has one end secured to the spring hook 23 and the opposite end secured to the web 19. The wing nut 24 can be used to adjust the tension of the spring 25.

The vertically adjustable bracket 26 is mounted on the shaft 11 and has a thumb screw 27 for locking the bracket 26 in vertically adjustable position on the shaft 11. A coil tension spring 28 extends between the web 19 and the bracket 26 as can be seen in FIGS. 2, 5 and 6.

A toggle brace generally indicated at 29 is pivotally secured to a bracket 30 on the rod 13 at one end and pivotally secured to a bracket 31 on the shaft 11 at the opposite end. The toggle brace 29 includes an arm 31A and an arm 32 pivotally secured together by a pivot pin 33. A flange 34 on the arm 32 engages under the arm 31A to prevent the bracket 29 from braking upwardly after it has been moved to its straight position.

A U-shaped arm 35 is secured to the tubular support 20 and extends downwardly encompassing the rod 14 with the bight 36 thereof adapted for engagement with the arms 31A, 32 at the pivot 33.

In the use and operation of the invention the shafts 11 and 12 are forced into the ground so that the shaft 11 is upright and extending substantially above the ground. The rod 14 is pivoted upwardly to its nearly horizontal position with the toggle brace 29 locked in its over dead center position as illustrated in FIG. 2. The spring 28 assists in locking the toggle brace 29 in its locked position. The fishing pole P then is used to cast the bait and hook to the desired point and the butt B of the fishing pole is inserted in the tubular support 20. The tension of the spring 25 is adjusted by means of the wing nut 24 so that the arm 35 rests lightly on the toggle brace 29 in the position as illustrated in FIG. 2. The device may then be left if desired since the action of a fish pulling on the hook and bait will cause the arm 35 to drop downwardly against the tension of the spring 25 breaking the toggle brace 29 downwardly so that the spring 28 can pull the arm 14 rapidly downwardly into the position illustrated in FIG. 6. This will set the hook in the fish and the fisherman can return to the device, remove the fish pole P from the support 20, and play the fish in the normal manner.

Having thus described the preferred embodiment of the invention it should be understood that numerous structural modifications and adaptations may be resorted to without departing from the spirit of the invention.

What is claimed is:

1. An automatic fish hook setter and fish pole holder comprising an upright shaft, an arm pivoted at one end to the upper end of the said shaft and extending generally horizontally, a toggle brace pivotally connected between the upright shaft and the arm for supporting said arm, spring means extending between the other end of said arm and said shaft for moving said arm downwardly toward said shaft, a tubular fish pole support pivotally mounted on said other end of said arm, means on the outer end of said support and resting on the toggle brace for moving said toggle brace out of supporting position permitting said arm to be swung downwardly by said spring.

2. A device as claimed in claim 1 including adjustable tension means extending between said other end of said arm and the rear end of said support for limiting the pivotal movement of said support on said arm.

3. A device as claimed in claim 1 wherein said spring is adjustably secured at one end to said shaft.

4. A device as claimed in claim 1 wherein the means on said support for moving said brace out of supporting position comprises a generally U-shaped arm rigidly secured to said support adjacent the outer end thereof.

5. A device as claimed in claim 1 including a second shaft arranged in spaced parallel relation to said first shaft and a foot tread connecting said shafts for forcing said shafts into the ground.

* * * * *